United States Patent
Mazzarini et al.

(10) Patent No.: US 10,710,567 B2
(45) Date of Patent: Jul. 14, 2020

(54) CABLE-PULLING ACTUATION SYSTEM FOR A PARKING BRAKE AND PARKING BRAKE THEREOF

(71) Applicant: FRENI BREMBO S.P.A., Curno, Bergamo (IT)

(72) Inventors: Nicolo Mazzarini, Curno (IT); Simone Berra, Curno (IT); Italo Pirovano, Curno (IT); Tomasz Woloszyn, Curno (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 163 days.

(21) Appl. No.: 16/083,701

(22) PCT Filed: Mar. 10, 2017

(86) PCT No.: PCT/IB2017/051420
§ 371 (c)(1),
(2) Date: Sep. 10, 2018

(87) PCT Pub. No.: WO2017/153964
PCT Pub. Date: Sep. 14, 2017

(65) Prior Publication Data
US 2020/0189549 A1 Jun. 18, 2020

(30) Foreign Application Priority Data

Mar. 10, 2016 (IT) .................. 102016000025362

(51) Int. Cl.
*F16D 65/16* (2006.01)
*B60T 13/74* (2006.01)
(Continued)

(52) U.S. Cl.
CPC ............ *B60T 13/746* (2013.01); *B60T 1/067* (2013.01); *F16D 51/22* (2013.01); *F16D 65/22* (2013.01);
(Continued)

(58) Field of Classification Search
CPC ........ B60T 7/085; B60T 7/107; B60T 13/588; B60T 13/745; F16D 65/16; F16D 65/72
(Continued)

(56) References Cited

U.S. PATENT DOCUMENTS 6,145,634 A 11/2000 Holding
7,337,882 B2 * 3/2008 Geyer ..................... B60T 7/107
188/2 D
(Continued)

FOREIGN PATENT DOCUMENTS

EP 1593569 A1 11/2005
JP H08296674 A 11/1996
(Continued)

OTHER PUBLICATIONS

European Patent Office, International Search Report and Written Opinion, dated Jul. 13, 2017, 11 pages, European Patent Office, Rijswijk, Netherlands.

*Primary Examiner* — Christopher P Schwartz
(74) *Attorney, Agent, or Firm* — Marshall & Melhorn, LLC (57) ABSTRACT

A cable-pulling actuation system for a parking brake having a body that houses a motor, a tie rod, suitable to actuate along an actuation direction, in correspondence of a first end, an actuating member of a drum brake, and a transmission that operatively connects the motor to a second end of the tie rod. The second end of the tie rod is integral in translation with a first screw, having a first thread with a first pitch. The first screw is engaged, through the first thread, in a second screw. The second screw comprises a second thread with a second pitch, through which is in turn engaged in a nut screw integral with the body, the second thread being opposite to the first thread. The second screw being actuated in rotation by the transmission.

15 Claims, 10 Drawing Sheets

(51) Int. Cl.
*B60T 1/06* (2006.01)
*F16D 51/22* (2006.01)
*F16D 65/22* (2006.01)
*F16H 25/20* (2006.01)
*F16D 121/24* (2012.01)
*F16D 125/40* (2012.01)
*F16D 125/70* (2012.01)

(52) U.S. Cl.
CPC ......... *F16H 25/20* (2013.01); *F16D 2121/24* (2013.01); *F16D 2125/40* (2013.01); *F16D 2125/70* (2013.01); *F16H 2025/209* (2013.01); *F16H 2025/2046* (2013.01); *F16H 2025/2059* (2013.01); *F16H 2025/2081* (2013.01); *F16H 2025/2084* (2013.01); *F16H 2025/2087* (2013.01)

(58) Field of Classification Search
USPC ......... 188/2 D, 156–164; 74/501.5 R, 502.4, 74/502.6
See application file for complete search history.

(56) References Cited

U.S. PATENT DOCUMENTS

| | | | |
|---|---|---|---|
| 7,448,475 B2 | 11/2008 | Mourad et al. | |
| 8,011,482 B2* | 9/2011 | Boyle | B60T 13/746 188/156 |
| 8,061,490 B2 | 11/2011 | Di Stefano et al. | |
| 8,235,181 B2* | 8/2012 | Sano | B60T 13/746 188/156 |
| 9,097,300 B2* | 8/2015 | Akada | F16D 51/50 |
| 9,873,411 B2* | 1/2018 | Deutloff | B60T 7/085 |
| 2020/0055505 A1* | 2/2020 | Choi | B60T 13/588 |

FOREIGN PATENT DOCUMENTS

| | | |
|---|---|---|
| WO | 97/13988 A1 | 4/1997 |
| WO | 2005/005212 A1 | 1/2005 |
| WO | 2007/093613 A1 | 8/2007 |

* cited by examiner

CABLE-PULLING ACTUATION SYSTEM FOR A PARKING BRAKE AND PARKING BRAKE THEREOF

FIELD OF APPLICATION

The present invention relates to a cable-pulling actuation system for a parking brake and to a related parking brake comprising said actuation system.

PRIOR ART

In particular, parking brakes for vehicles are usually drum brakes, commonly referred to as 'DIH', i.e. drum-in-hat, comprising a bell integral in rotation with the wheel hub and a pair of clamping jaws adapted to exert a braking action on the bell. The jaws are coated with friction material and are movable, for example by rotation about a hinge point, from a locking or parking configuration, in which they abut against said bell, to a release configuration in which they do not interface with said bell, which is thus free to rotate. The actuation of the jaws is carried out by a cable or other tie rod, for example, a bar or a chain, etc. which, once set in traction, moves the jaws, for example by means of a lever.

In order to ensure the opening of the jaws on the disc bell and the consequent parking of the vehicle, it is necessary to provide traction tensile force to the cable connected to said lever.

This cable traction function can be carried out by an electrically controlled actuation system.

The known cable-pulling systems for DIH have relatively long times for the locking/release steps, essentially due to the fact that, due to the wear of the jaws, the distances between the jaws themselves and the bell of the DIH greatly increases over time.

Thus, with increasing wear, the stroke that the jaws must travel to obtain the same braking locking effect of the wheel for parking increases.

The increase in the parking system actuation time is often considered unacceptable by users who feel the need to have an actuation system that gives them a better feeling. In other words, users want a parking system that is more ready and responsive in order to avoid unnecessary waiting times.

DISCLOSURE OF THE INVENTION

To date, various solutions have been adopted in the art aimed at reducing the overall dimensions of the parking systems and/or the related costs, but none of the known solutions has been able to solve the technical problem of excessive lengthening of the actuation time of drum parking brakes (DIH), widely used on commercial vehicles.

The need of solving the drawbacks and limitations mentioned with reference to the prior art is therefore felt.

Such a need is met by a cable-pulling actuation system for a parking brake according to claim 1.

In particular, such a need is met by a cable-pulling actuation system for a parking brake comprising a body that houses motor means, a tie rod, suitable to actuate along an actuation direction X-X, in correspondence of a first end, an actuating member of a drum brake, transmission means that operatively connect the motor means to a second end of the tie rod, wherein the second end of the tie rod is integral in translation with a first screw, having a first thread with a first pitch, wherein said first screw is engaged, through the first thread, in a second screw, the second screw comprises a second thread with a second pitch, through which is in turn engaged in a nut screw integral with the body, the second thread being opposite to the first thread, the second screw being actuated in rotation by said transmission means, wherein the second screw is engaged with a prismatic coupling to an output gear of the transmission means, in order to roto-translate with respect to the actuation direction X-X, while maintaining the mechanical connection with the transmission means.

According to a possible embodiment, the output gear that meshes with the second screw is constrained to the body with respect to an axial direction parallel to said actuation direction.

According to a possible embodiment, said first and second thread are irreversible.

According to a possible embodiment, said transmission means are configured so as to realize, as a whole, a motion transmission of the irreversible type.

According to a possible embodiment, the first and the second pitch of the screws are between 1 mm and 5 mm.

According to an embodiment, the thread of at least one of said first and second screw is provided with two or more helixes.

According to a possible embodiment, the first screw comprises a first prismatic connection with the body so as to force the first screw to translate axially with respect to the second screw, parallel to said actuation direction X-X, without being able to rotate with respect to the body.

According to a possible embodiment, the first and the second screw are coaxial with each other and with said actuation direction X-X of the tie rod.

According to a possible embodiment, the first screw is at least partially housed inside the second screw, said first and second screw being hollow in order to be passed through by the tie rod.

According to a possible embodiment, the second thread of the second screw is arranged axially on the opposite side with respect to the second end of the tie rod.

According to a possible embodiment, the first screw comprises a fixing head that locks in translation the second end of the tie rod creating an undercut, along the axial direction, with respect to an actuation direction of the tie rod, wherein the fixing head is arranged axially opposite the second thread, externally to the second screw.

According to a possible embodiment, the fixing head is provided with elastic means influenced in compression by the traction action of the tie rod.

According to a possible embodiment, the transmission means comprise an epicyclic gear train of at least two stages.

According to a possible embodiment, the transmission means comprise a worm screw, keyed coaxially to the motor means that meshes with a crown that acts as an output gear of the transmission means, wherein a rotation axis of the motor means and the actuation axis of the first screw are perpendicular to each other.

According to a possible embodiment, a parking brake is provided, comprising a cable-pulling actuation system as described above and further comprising a drum brake provided with a rotating bell and at least one jaw provided with a friction coating, suitable to exert a braking action on the bell when actuated, wherein the jaw is provided with an actuating member and wherein the first end of the tie rod is connected to said actuating member.

DESCRIPTION OF THE DRAWINGS

Further features and advantages of the present invention will appear more clearly from the following description of preferred non-limiting embodiments thereof, in which.

Elements or parts of elements in common between the embodiments described below are referred to with the same reference numerals.

DETAILED DESCRIPTION

With reference to the above figures, reference numeral 4 globally indicates a cable-pulling actuation system for a parking brake comprising a body 12 which houses motor means 16.

For the purposes of the present invention, the size and the material of body 12 are not defined. Moreover, the motor means are preferably, but not exclusively, electric motors. For example, an electric brush motor in direct current is used.

System 4 comprises a tie rod 20, suitable to actuate along an actuation direction X-X, in correspondence of a first end 24, an actuating member 28 of a drum brake 32 and/or a parking brake.

It should be noted that said actuation direction X-X is not necessarily fixed in space, but it is instead possible to provide that the tie rod can traverse and therefore that the actuation direction can vary its orientation in space during the operation of the parking brake.

Tie rod 20 may comprise either a cable or a rod.

Figure 9A:
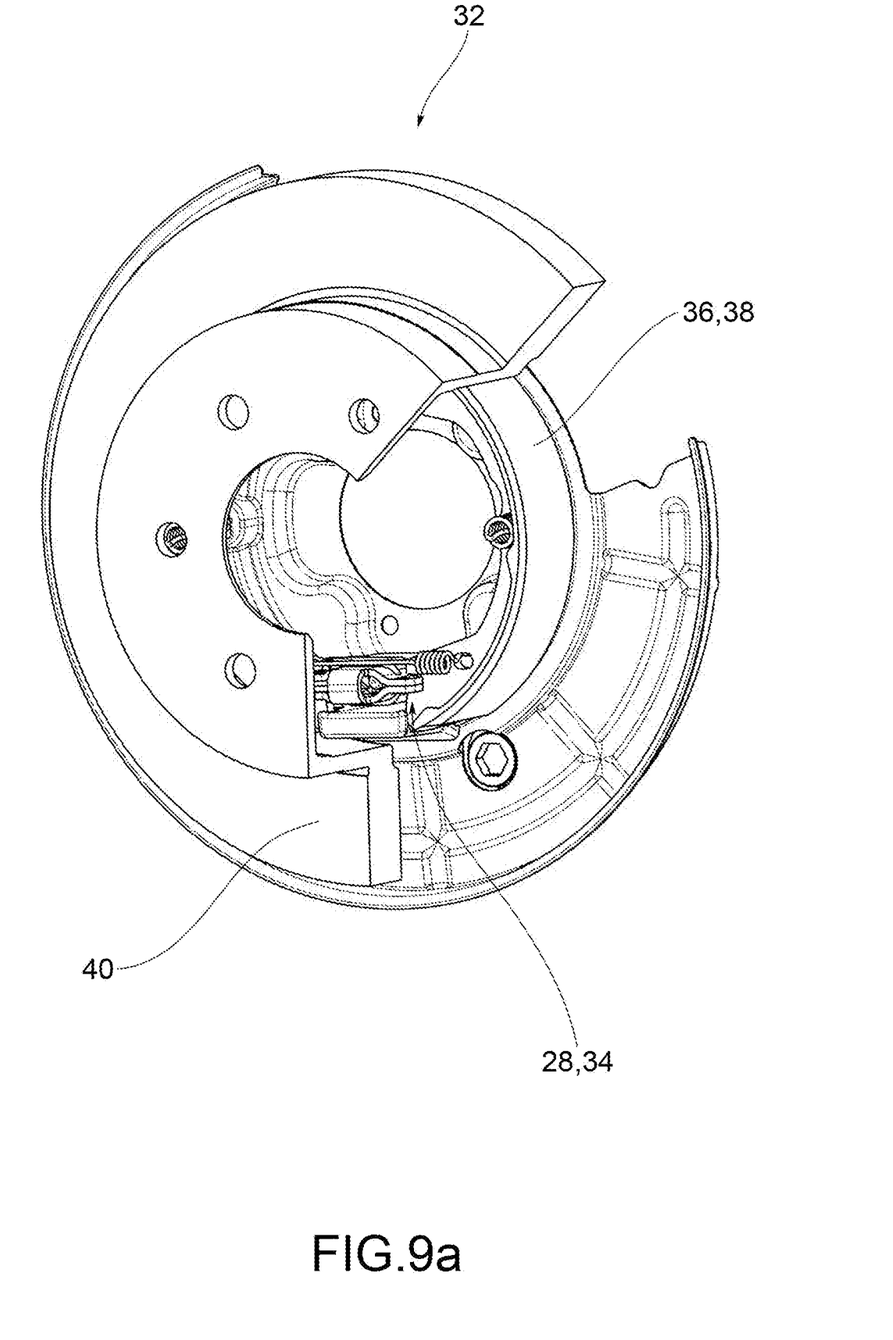
FIGS. 9a-9b show perspective sectional views of a drum brake connectable to the cable-pulling actuation system for a parking brake according to the present invention.
Figure 9B:
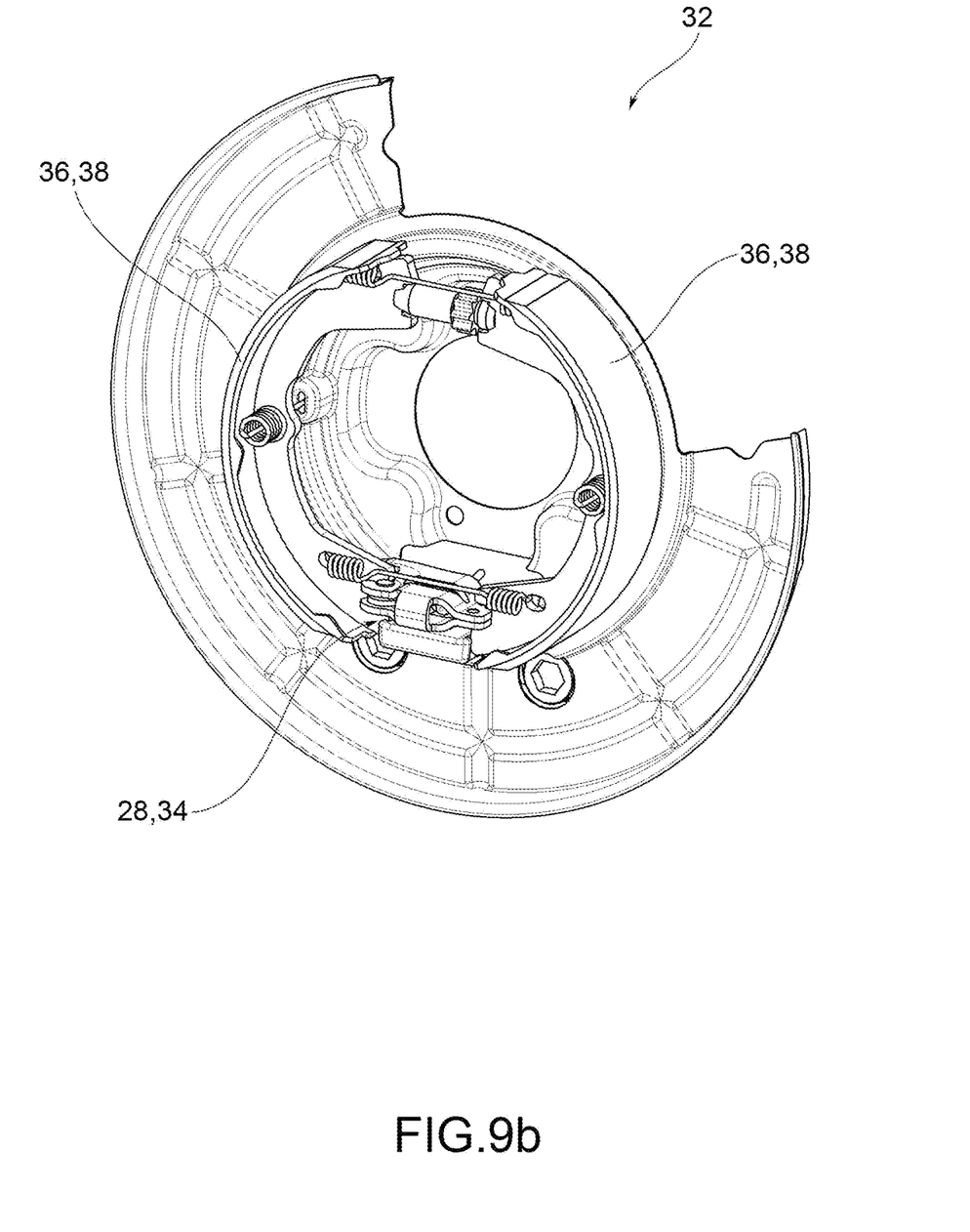

The actuating member 28 of the drum brake 32 for example comprises a lever 34 adapted to act on at least one jaw 36, usually two jaws 36, provided with a friction coating 38.

The drum brake 32 is provided with a rotating bell 40, at least one jaw 36, provided with friction coating 38, is adapted to exert a braking action on bell 40 when actuated.

Jaw 36 may for example be hinged so as to have a rotating actuating motion or it may also be mounted on a slide so as to be translated against bell 40 by means of said actuating member 28.

The first end 24 of tie rod 20 is connected to said actuating member 28 so as to allow the movement of said jaws 36.

System 4 comprises transmission means 44 that operatively connect the motor means 16 to a second end 48 of tie rod 20.

The second end 48 is axially opposite to the first end 24 along said actuation direction X-X.

The second end 48 is integral in translation with a first screw 52, having a first thread with a first pitch P1.

The first screw 52 is in turn engaged, through the first thread 56, in a second screw 60, having a second thread 64 with a second pitch P2.

The second screw 60, through the second thread 64, is in turn engaged in a nut screw 68 integral with body 12.

Advantageously, the second thread 64 is opposite to the first thread 56.

The second screw 60 is actuated in rotation by said transmission means 44, so as to move tie rod 20 through the motor means 16, as better described hereinafter.

Said first and second thread 56, 64 are irreversible: in this way, after actuating the motor means and moving the screws and, with them, tie rod 20, the screws, due to the irreversibility of the respective pitches, remain in position even when the actuating action of the motor means 16 ends, in particular ensuring the locking of jaws 36.

According to a possible embodiment, the transmission means 44 are configured so as to realize, as a whole, a motion transmission of the irreversible type.

Preferably, the first and the second pitch P1, P2 of the first and second screw 52, 60 are of between 1 mm and 5 mm.

According to a possible embodiment, thread 56, 64 of at least one of said first and second screw 52, 60 is provided with two or more helixes.

The first screw 52 comprises a first prismatic connection 72 with body 12 so as to make the first screw translate axially, i.e. parallel to the actuation direction X-X, with respect to the second screw 60, without being able to rotate with respect to the body and with respect to the same actuation direction X-X.

For example, the first prismatic connection 72 comprises a key 73 coupled to a groove 74 which acts as an anti-rotation around the actuation direction X-X, while allowing a translation parallel to said actuation direction X-X.

Preferably, the first and the second screw 52, 60 are coaxial with each other and with said actuation direction X-X of tie rod 20.

Moreover, the second screw 60 is engaged with a second prismatic coupling 78 to an output gear 80 of the transmission means 44, in order to roto-translate with respect to the actuation direction X-X, while maintaining the mechanical connection with the transmission means 44.

In turn, said output gear 80, which meshes with the second screw 60, is axially constrained to body 12.

Said output gear 80 is axially locked on one side by an abutment 81 on body 12, on the side of the motor means 16, and on the other one by a bushing 82, for example co-molded in body 12 on a fixing side 83 of the actuation system 4.

According to an embodiment, the output gear 80 is inserted into bushing 82 itself, thereby facilitating the rotation thereof.

Preferably, the first screw 52 is at least partially housed inside the second screw 60, said first and second screw 52, 60 being hollow in order to be passed through by tie rod 20.

Preferably, the second thread 64 of the second screw 60 is arranged axially on the opposite side with respect to the second end 48 of tie rod 20.

According to an embodiment, the first screw 52 comprises a fixing head 84 that locks in translation the second end 48 of tie rod 20 creating an undercut 86, along the axial direction X-X, with respect to an actuation direction S of tie rod 20.

For example, the fixing head 84 is arranged on the side axially opposite the second thread 64, externally to the second screw 60. In other words, preferably, the fixing head 84 is not contained within the second screw 60.

According to an embodiment, the fixing head 84 is provided with elastic means 88 influenced in compression by the traction action of tie rod 20.

For example, said elastic means 88 comprise cup springs 90. Of course, other types of springs may be used as elastic means 88, according to the required elastic features and dimensions.

The presence of the elastic means 88, such as the packet of cup springs 90, serves to prevent overloading on the first screw 52 and on the second screw 60 after the possible cooling of bell 40 of the drum brake which causes a traction movement of tie rod 20 with respect to the mechanism.

As seen, the transmission means 44 connect the motor means 16 to the second end 48 of tie rod 20. According to a possible embodiment, the transmission means 44 comprise an epicyclic gear train of at least two stages 92. The connection between said at least two-stage epicyclic gear train 92 and the motor means 16 takes place for example by means of a pinion 91, integral in rotation to a drive shaft of the motor means 16.

For example, the latter is an epicyclic gear train to at least two stages 92 with a fixed outer crown 94. The gear train further comprises, in a known manner, first stage satellites 95 and two satellite holders 96, 98.

For example, the first stage satellites 95 mesh with said pinion 91.

Second stage satellites 97 are also provided.

The fixed outer crown 94 along with satellites 95 and the satellite holders 96, 98 form a cartridge 99 which is inserted in a dedicated seat 100 of body 12.

In particular, there is provided the first stage satellite holder 96 and the second stage satellite holder 98, arranged mutually coaxially, parallel to said actuation direction X-X.

Cartridge 99 is locked to the axial translation and to rotation, for example by two teeth 101 placed at 180° in turn engaged in the body itself.

The epicyclic gear train 92 is guided by a centering pin 102, for example co-molded in body 12.

According to a possible embodiment, a further ordinary reduction stage consists of a wheel 103 in output from the epicyclic gear train that engages the output gear 80, of larger diameter, in order to obtain a third reduction stage.

Preferably, in the embodiment that involves the use of an epicyclic gear train, the transmission means 44 are arranged so that the motion input axis, i.e. the axis of rotation of the motor means 16, and the motion output axis, i.e. the actuation axis X-X of the first screw 52 are parallel to each other. In this way, the motor means are arranged parallel to tie rod 20 and to the actuation direction X-X.

According to further embodiments, the transmission means 44 use gears and gear trains of various types, also ordinary and not epicyclic. In other words, the use of an epicyclic train, regardless of the number of stages, is only a possible, non-limiting embodiment of the present invention.

Figure 10:
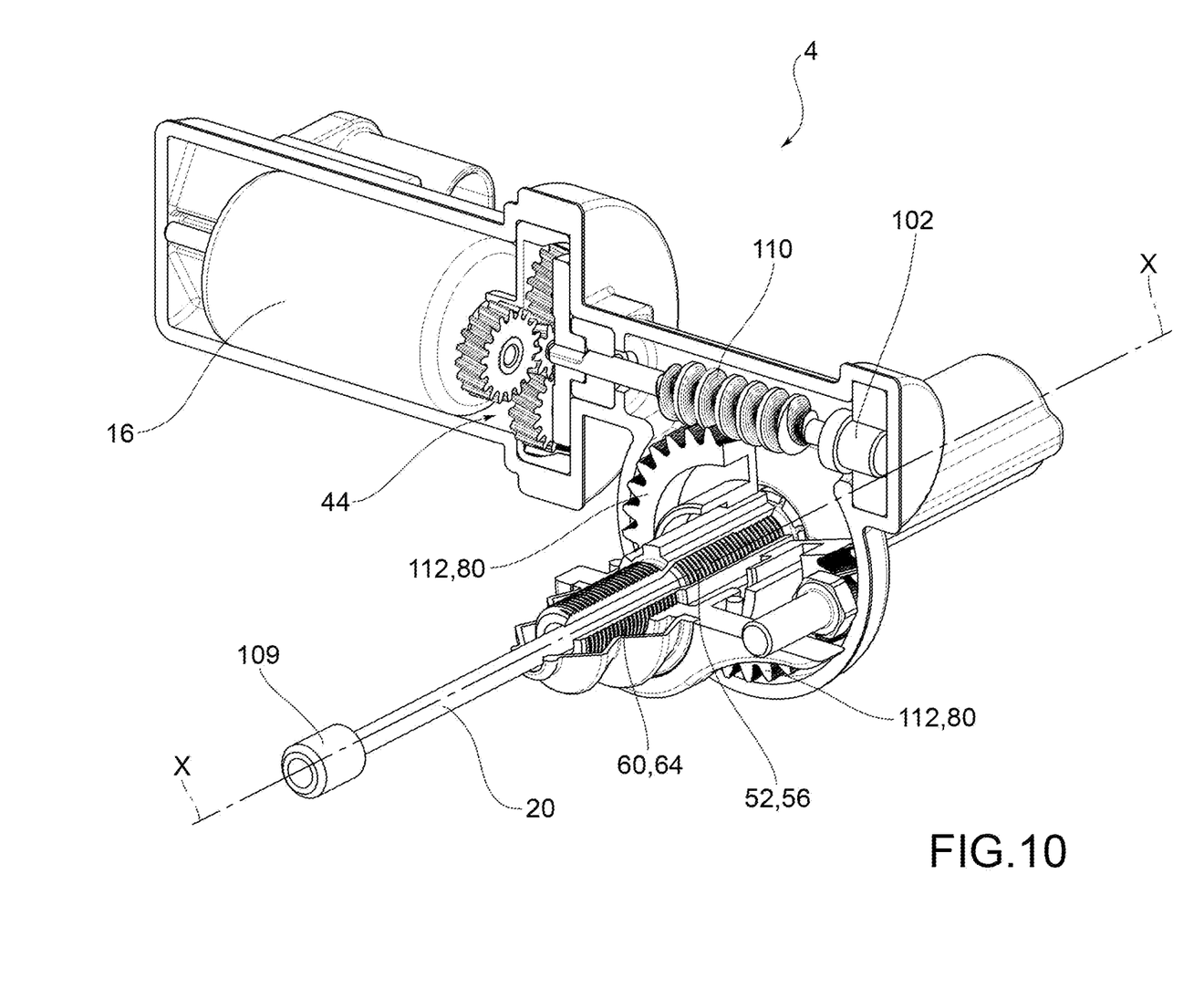
FIG. 10 shows a perspective sectional view of a cable-pulling system for a parking brake according to a further embodiment of the present invention.

According to a further possible embodiment, said transmission means 44 comprise a worm screw, keyed coaxially to the motor means 16 which meshes with a crown 112 which acts as an output gear 80. Preferably, the transmission means 44 are arranged so that the motion input axis, i.e. the axis of rotation of the motor means 16, and the motion output axis, i.e. the actuation axis X-X of the first screw 52 are perpendicular to each other.

In this way, the motor means 16 are arranged perpendicular to tie rod 20 and to the actuation direction X-X.

According to further embodiments, the transmission means 44 are arranged so that the motion input axis, i.e. the axis of rotation of the motor means 16, and the motion output axis, i.e. the actuation axis X-X of the first screw 52 are arranged according to directions not perpendicular to each other.

For example, the angle between the axis of the motor means 16 and the actuation axis X-X of the first screw 52 may be configured with any value, even perpendicular, as a function of how the worm screw 110 and the teeth of the output gear 112, 80 are oriented.

The hydraulic seal of system 4 is ensured by an O-ring 104 and by a weld between at least two parts of body that allow isolating the inner zone containing the gears of the transmission means 44 from the outside.

A dust seal 105 crimped to tie rod 20 and fixed to a flange 106 of body 12 allows obtaining a second seal.

Flange 106, preferably made of steel or other material, is directly connected to a wheel side fastening, for example through two fixing screws 108.

Of course, the number of fixing screws 108 employed is not relevant and can be varied.

The fixing of flange 106 to the fixed structural part of the drum brake 32, or to a hub carrier, allows relieving the tensile force necessary for the application of braking.

At the first end 24 of tie rod 20 there is a crimped terminal 109 for connection to the vehicle brake. Of course, crimping is only one possible fixing means of terminal 109.

The operation of a cable-pulling system for a parking brake according to the present invention shall now be described.

Figure 1:
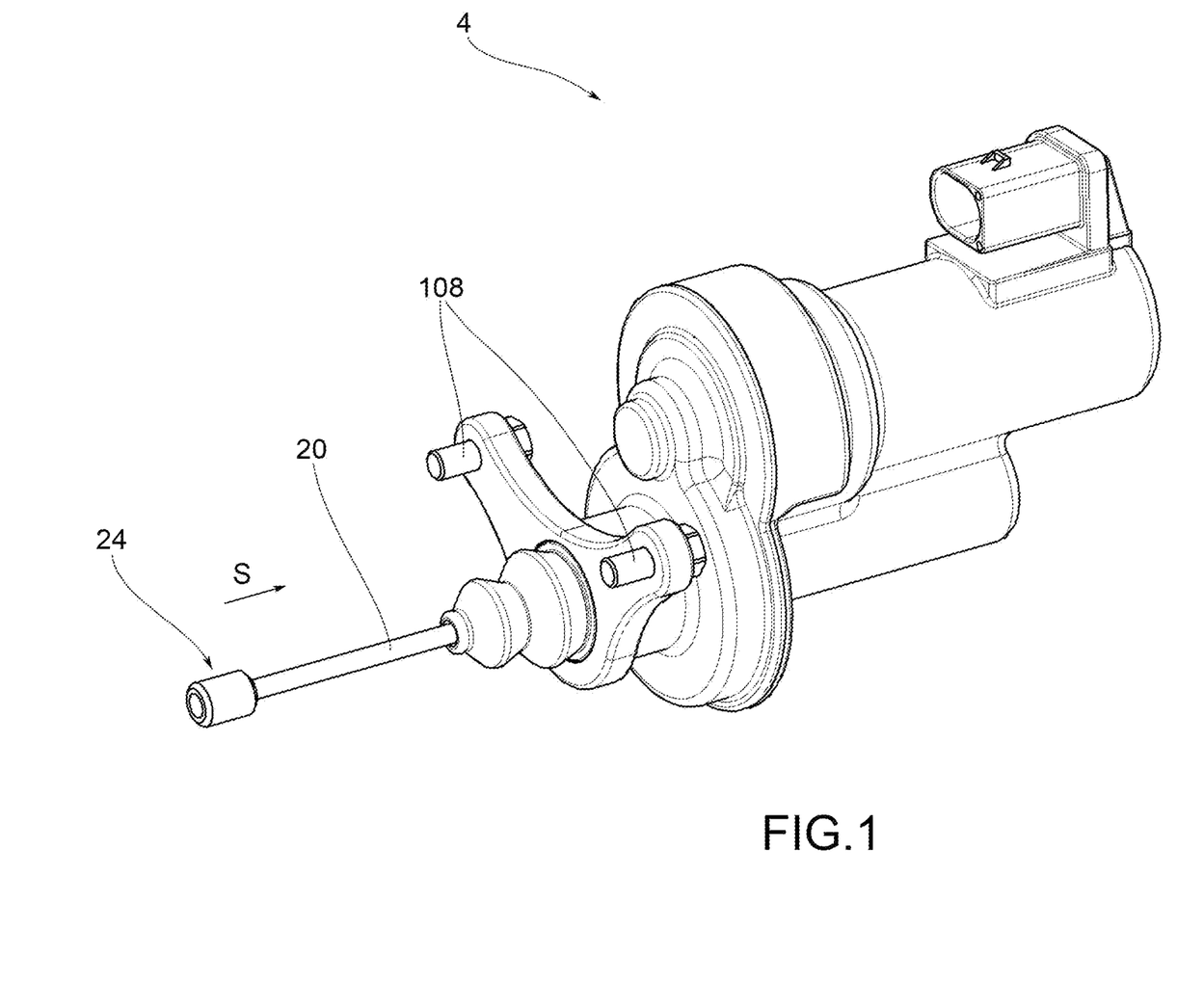
FIG. 1 shows a perspective view of a cable-pulling system for a parking brake in assembled configuration, according to the present invention.
Figure 2:
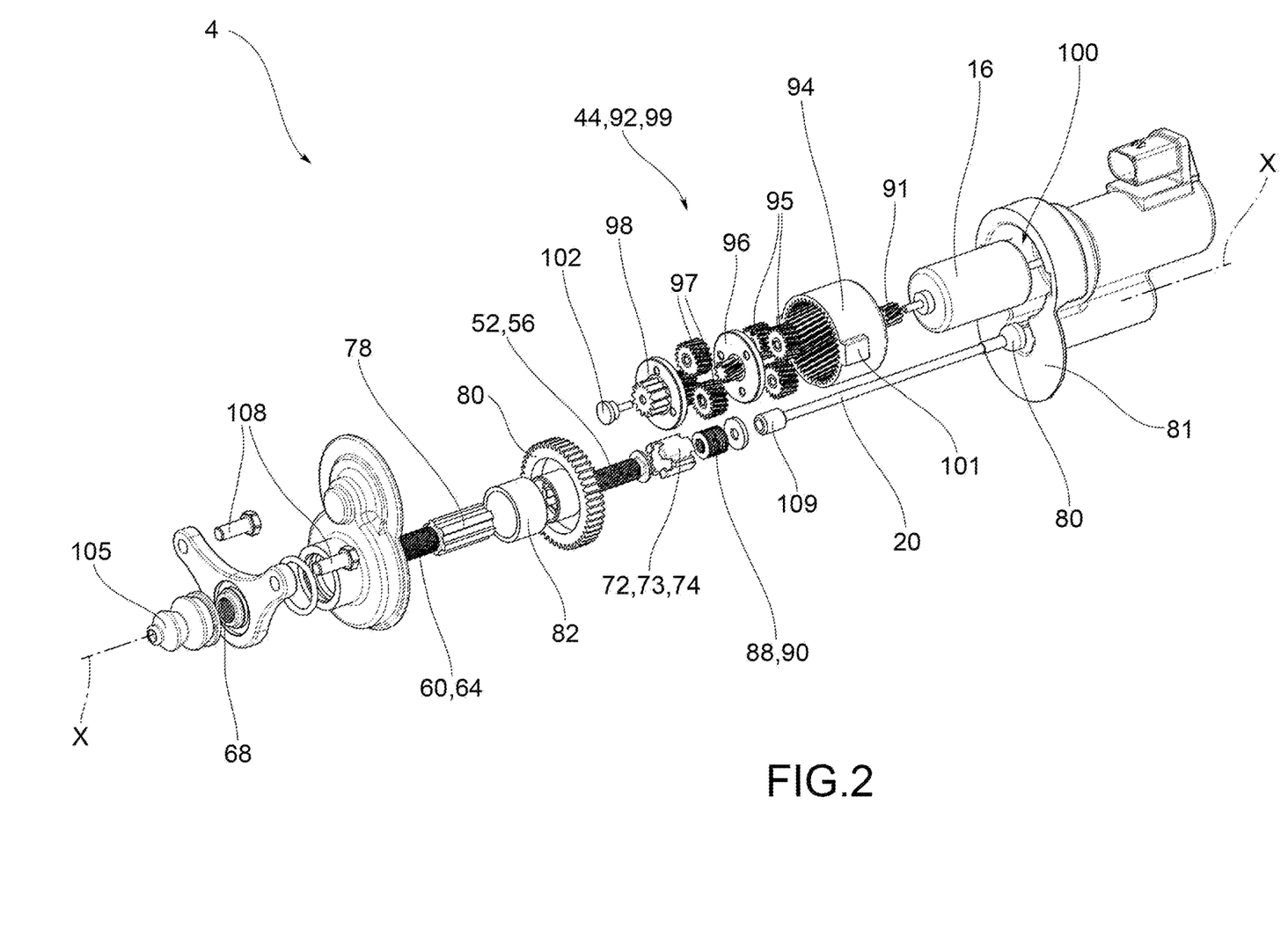
FIG. 2 shows an exploded view of the cable-pulling system for a parking brake in FIG. 1.
Figure 3:
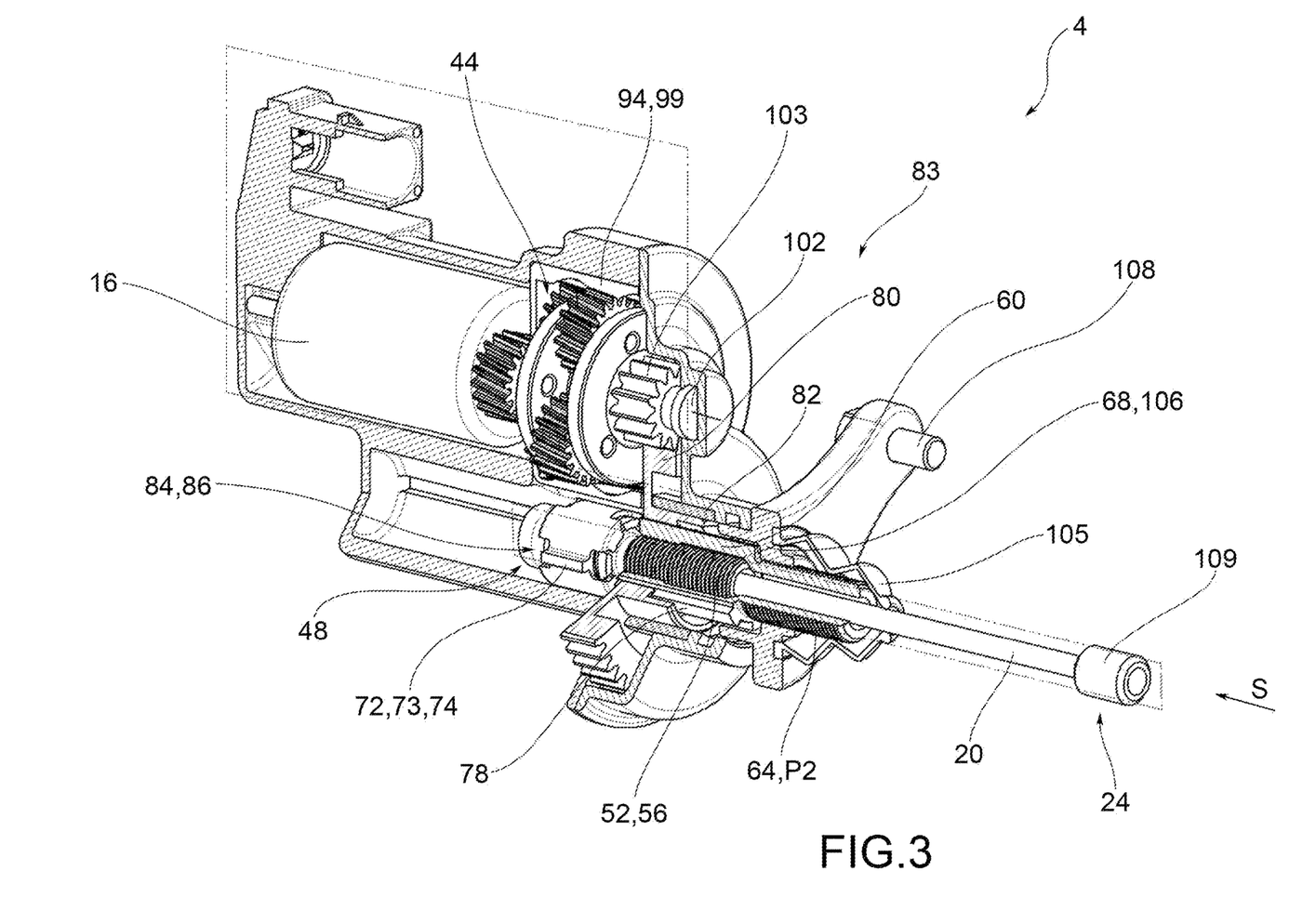
FIG. 3 shows a partially sectional view, in assembled configuration, of the cable-pulling system for a parking brake in FIG. 1.
Figure 4:
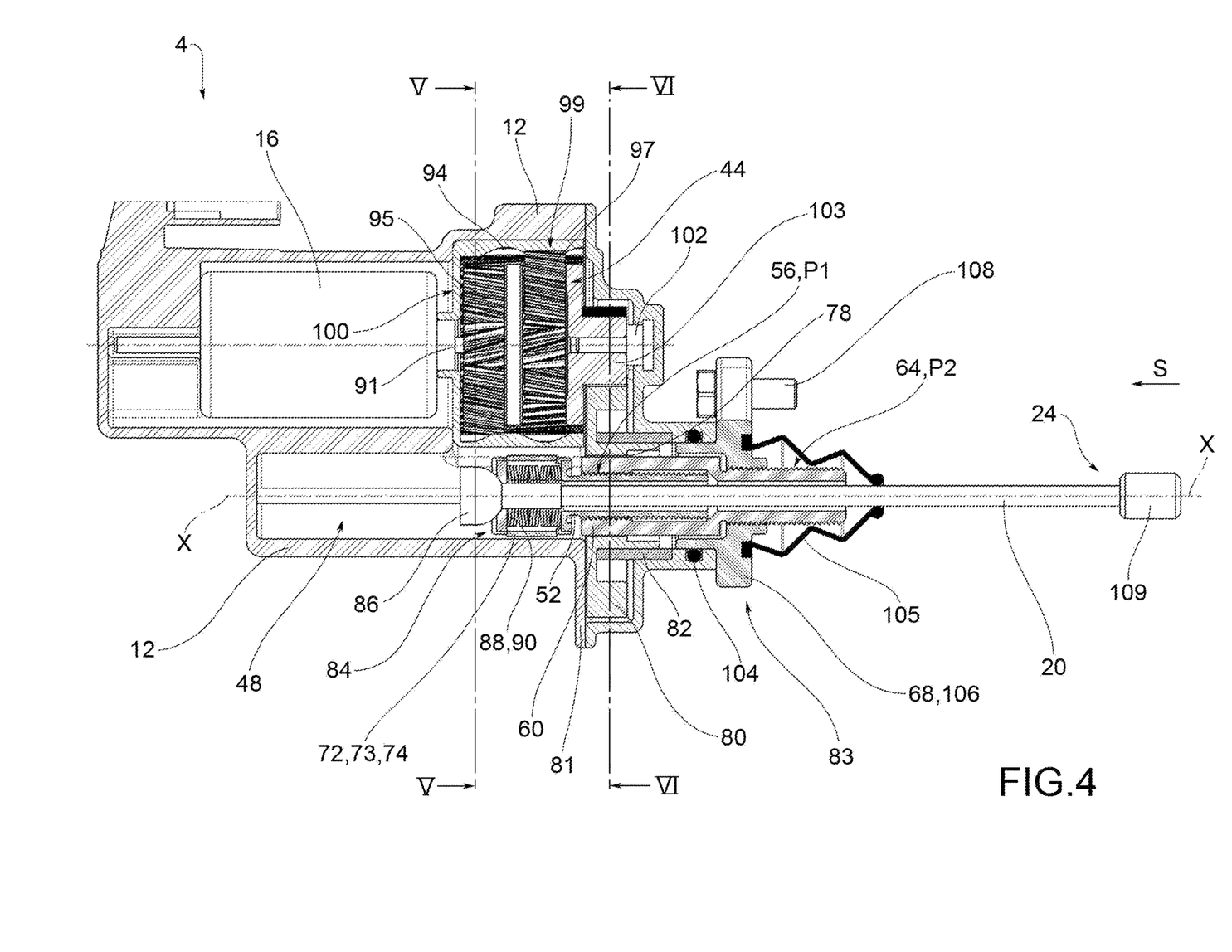
FIG. 4 shows a sectional view, in assembled configuration, of the cable-pulling system for a parking brake in FIG. 1.
Figure 5:
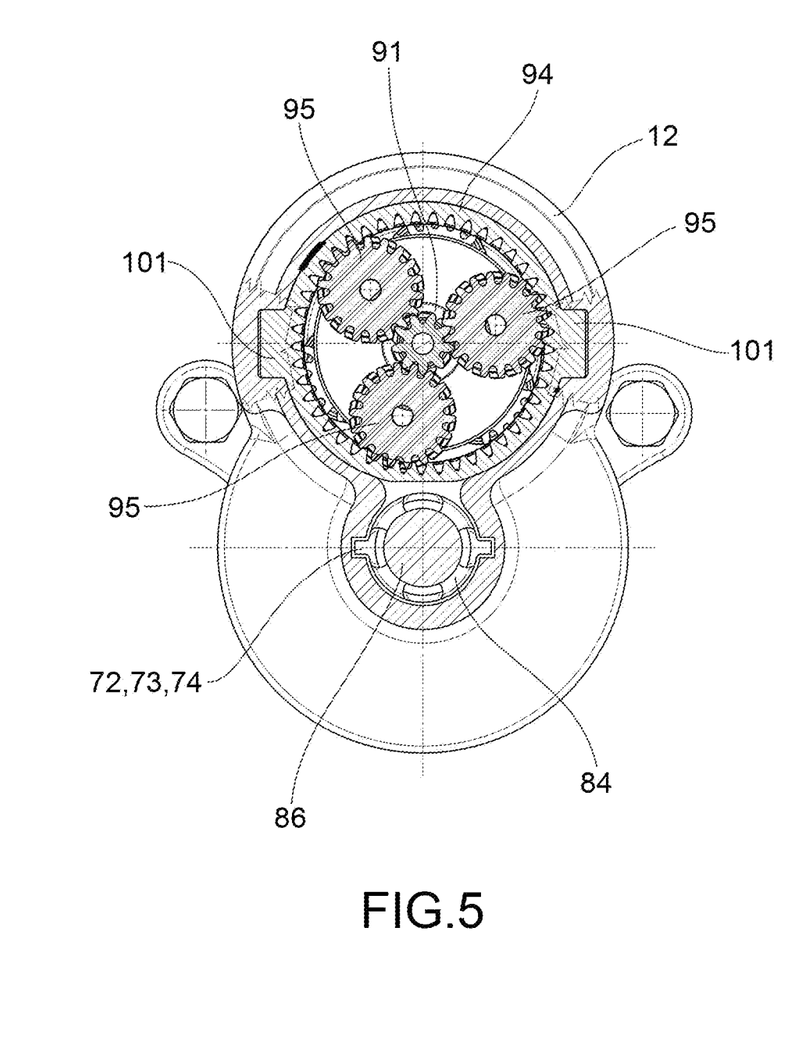
FIG. 5 shows a sectional view of the cable-pulling system for a parking brake in FIG. 1, along the section plane V-V in FIG. 4.
Figure 6:
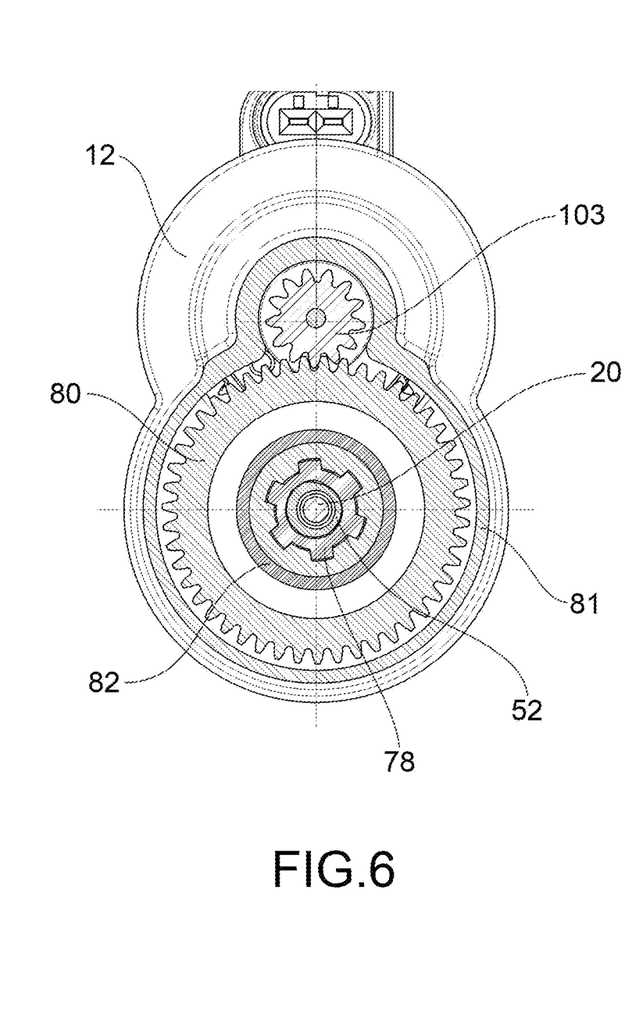
FIG. 6 shows a sectional view of the cable-pulling system for a parking brake in FIG. 1, along the section plane VI-VI in FIG. 4.
Figure 7:
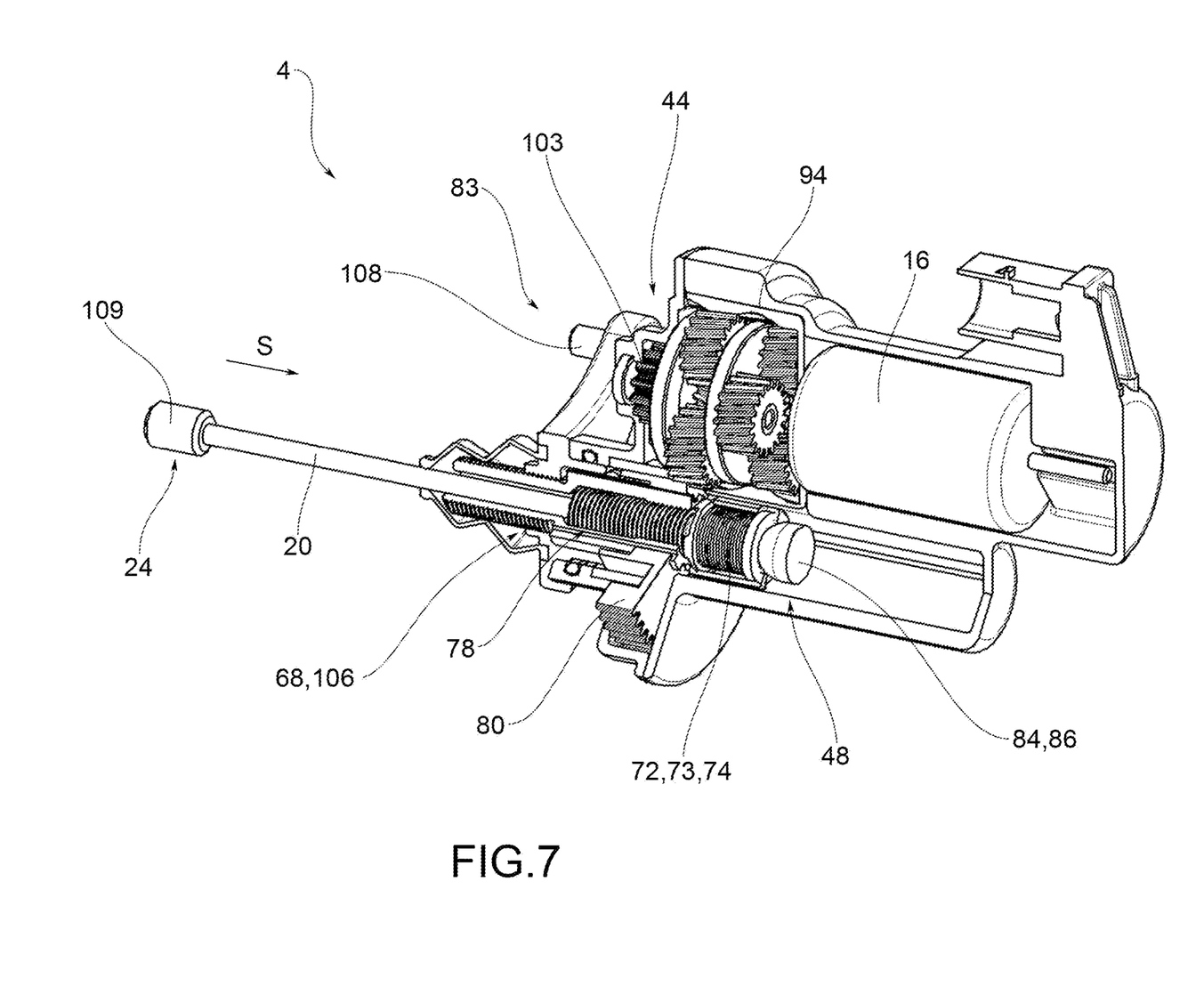
FIGS. 7-8 show perspective, partially sectional views of the cable-pulling actuation system for a parking brake in FIG. 1, in configuration of rest and application of the parking force, respectively.

FIG. 7 shows the system in the initial released configuration. From this configuration, the user may have the need to actuate the parking of the vehicle, thus blocking one or more wheels of the vehicle, by acting on the respective parking brakes of the drum type, by means of the motor means 16.

In particular, when the motor means 16 set the output gear 80 into rotation, through the kinematic chain of the transmission means 44, the output gear 80 sets the second screw 60 in rotation and this is unscrewed with respect to the nut screw 68, i.e. to flange 106, moving axially along the actuation direction X-X and carrying the first screw 52 which functions as a traction screw. The first screw 52, having the first thread 56 in the opposite direction to the second thread 64 of the second screw 60, and being locked in rotation, is in turn unscrewed by the second screw 60, thus adding this translational movement due to the unscrewing to that produced by the second screw 60 with the nut 68 or flange 106.

This system allows, at each revolution of the output gear 80, having a translation of tie rod 20 equal to the sum of pitches P1, P2 of the first and second screw 52, 60. Pitches P1, P2 of the first and second screw 52, 60 are selected to optimize the traction speed and the system efficiency, also ensuring the self-locking effect, which ensures the parking of the brake. The self-locking of the screws is obtained due to the fact that the first and the second thread are irreversible, said irreversibility being linked to the first and second pitch P1, P2, as well as to the relative diameter.

Figure 8:
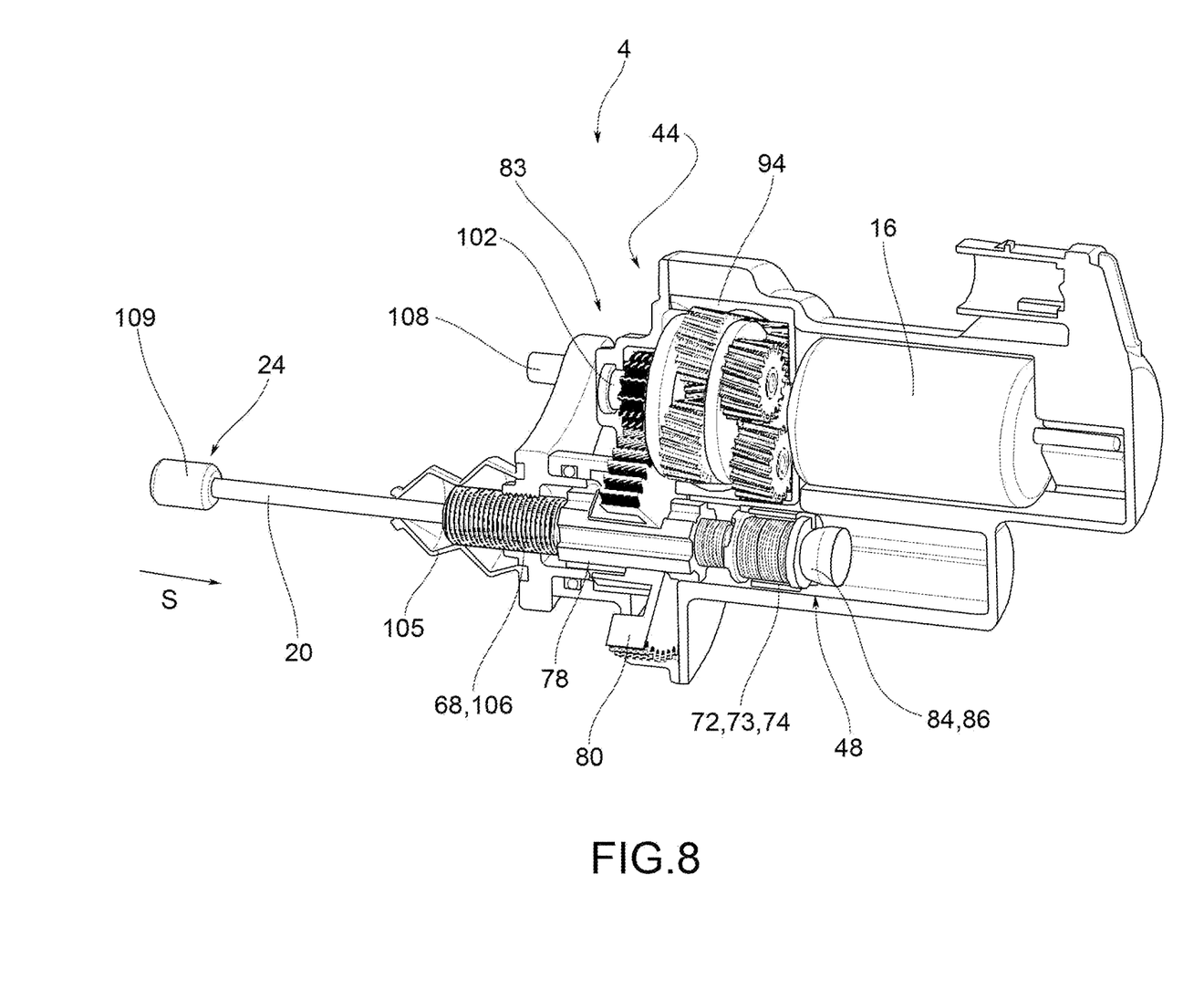

The parking configuration is shown for example in FIG. 8, which shows the axial stroke path that tie rod 20 has traveled, in particular its second end 48, in the foreground in the figure.

As can be seen from the above description, the cable-pulling actuation system for a parking brake according to the invention allows the drawbacks of the prior art to be overcome.

In particular, the cable-pulling system for a parking brake solves the problem of the actuation speed, ensuring less waiting time from the moment the system is started, which results into greater comfort for the driver.

The present invention is a system specifically dedicated to the actuation of a single actuation cable, acting on one wheel side only, by exploiting a mechanism that compared with known solutions, for the same speed of the electric motor used, allows a substantial doubling of the actuation speed of the device.

In fact, the present invention allows, for each revolution of the gear, having a translation of the traction element equal to the sum of the screw pitches. The pitches of the screws themselves are selected to optimize the traction speed and the system efficiency, while ensuring the self-locking effect, i.e. the irreversibility of the threaded connection, which in turn ensures the parking of the brake even after deactivating the motor means.

A man skilled in the art may make several changes and adjustments to the cable-pulling actuation system for a parking brake described above in order to meet specific and incidental needs, all falling within the scope of protection defined in the following claims.

The invention claimed is:

1. A cable-pulling actuation system for a parking brake, comprising:
   a body that houses a motor,
   a tie rod, suitable to actuate along an actuation direction, in correspondence of a first end, an actuating member of a drum brake and/or a parking brake,
   a transmission that operatively connects the motor to a second end of the tie rod,
   wherein the second end of the tie rod is integral in translation with a first screw, having a first thread with a first pitch,
   wherein said first screw is engaged, through the first thread, in a second screw,
   the second screw comprises a second thread with a second pitch, through which is in turn engaged in a nut screw integral with the body, the second thread being opposite to the first thread,
   the second screw being actuated in rotation by said transmission,
   wherein the second screw is engaged with a second prismatic coupling to an output gear of the transmission, in order to roto-translate with respect to the actuation direction, while maintaining the mechanical connection with the transmission.

2. The cable-pulling actuation system for a parking brake according to claim 1, wherein said output gear that meshes with the second screw, is constrained to the body, with respect to an axial direction parallel to said actuation direction.

3. The cable-pulling actuation system for a parking brake according to claim 1, wherein said first and second thread are irreversible.

4. The cable-pulling actuation system for a parking brake according to claim 1, wherein said transmission is configured so as to realize, as a whole, a motion transmission of the irreversible type.

5. The cable-pulling actuation system for a parking brake according to claim 1, wherein the first and second pitch respectively of the first and of the second screw are comprised between 1 mm and 5 mm.

6. The cable-pulling actuation system for a parking brake according to claim 1, wherein the thread of at least one of said first and second screw is provided with two or more helixes.

7. The cable-pulling actuation system for a parking brake according to claim 1, wherein the first screw comprises a first prismatic connection with the body so as to force the first screw to translate axially with respect to the second screw, parallel to said actuation direction, without being able to rotate with respect to the body.

8. The cable-pulling actuation system for a parking brake according to claim 1, wherein the first and the second screw are coaxial with each other and with said actuation direction of the tie rod.

9. The cable-pulling actuation system for a parking brake according to claim 1, wherein the first screw is at least partially housed inside the second screw, said first and second screw being hollow in order to be passed through by the tie rod.

10. The cable-pulling actuation system for a parking brake according to claim 1, wherein the second screw thread of the second screw is arranged axially on the opposite side with respect to the second end of the tie rod.

11. The cable-pulling actuation system for a parking brake according to claim 1, wherein the first screw comprises a fixing head that locks in translation the second end of the tie rod creating an undercut, along the axial actuation direction, with respect to an actuation direction of the tie rod, wherein the fixing head is arranged axially opposite the second thread, externally to the second screw.

12. The cable-pulling actuation system for a parking brake according to claim 11, wherein the fixing head is provided with elastic influenced in compression by the traction action of the tie rod.

13. The cable-pulling actuation system for a parking brake according to claim 1, wherein the transmission comprises an epicyclic gear train of at least two stages.

14. The cable-pulling actuation system for a parking brake according to claim 1, wherein said transmission comprises a worm screw, keyed coaxially to the motor that meshes with a crown that acts as an output gear of the transmission, wherein a rotation axis of the motor and the actuation axis of the first screw are perpendicular to each other.

15. The cable-pulling actuation system for a parking brake according to claim 1, further comprising a drum brake provided with a rotating bell and at least one jaw provided with a friction coating, suitable to exert a braking action on the bell when actuated, wherein the jaw is provided with an actuating member and wherein the first end of the tie rod is connected to said actuating member.

\* \* \* \* \*